Dec. 27, 1949     J. A. CHRISTMAN     2,492,784
MUFFLER WITH CUTOUT AND REMOVABLE BAFFLE
Filed Sept. 16, 1947
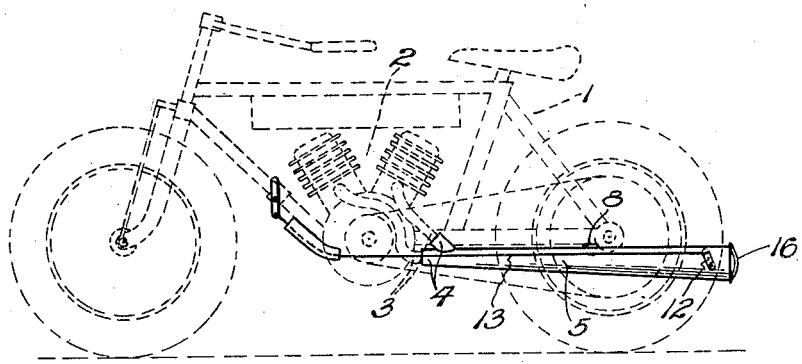
Fig. 1.
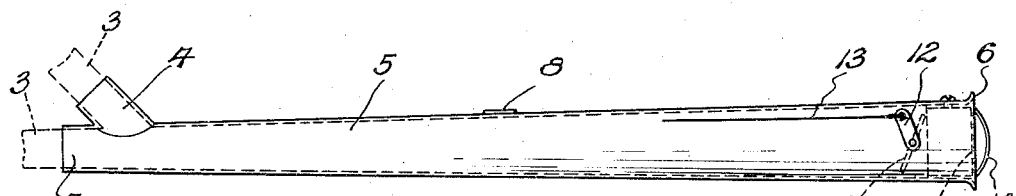
Fig. 2.
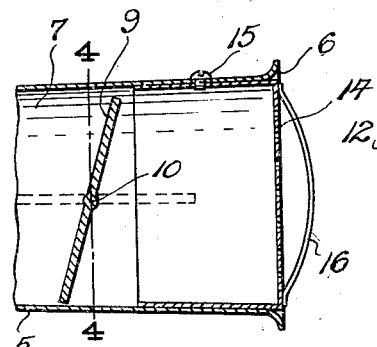 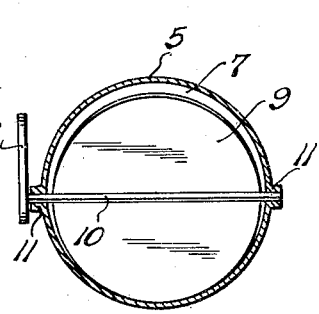 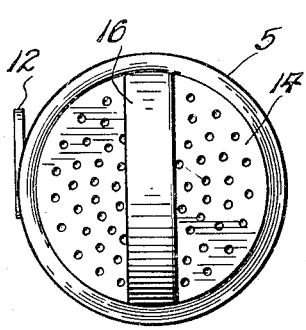
Fig. 3.     Fig. 4.     Fig. 5.
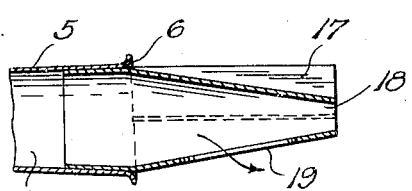 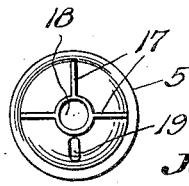
Fig. 6.     Fig. 7.
Inventor
John A. Christman
By W. S. McDowell
Attorney Patented Dec. 27, 1949

2,492,784

UNITED STATES PATENT OFFICE 2,492,784

MUFFLER WITH CUTOUT AND REMOVABLE BAFFLE

John A. Christman, Columbus, Ohio

Application September 16, 1947, Serial No. 774,395

4 Claims. (Cl. 181—35)

The present invention relates to mufflers for internal combustion engines, and has particular reference to an improved muffler adapted for attachment to the exhaust pipe or stack of a motorcycle engine, although not specifically limited to such adaptation.

Generally, the present day motorcycle is characterized by the undesirable and distracting noise produced by the explosions of its engine, and although particular attention is given to other vehicles, such as automobiles, to eliminate excessive engine noise, no concerted effort has been put forth to reduce the excessive, and in some instances, the unlawful noise produced by the ordinary motorcycle engine.

It is therefore, an object of this invention to provide a structurally simple, yet mechanically efficient muffler for motorcycles which functions to selectively reduce the noise produced by the explosions within the associated engine, yet does not impair the efficiency of the engine to any material extent by creating back pressures within the exhaust system.

It is another object of this invention to provide an improved muffler for internal combustion engines which consists of an elongated tube having an internal chamber or passageway progressively enlarged from the engine exhaust pipes outwardly of the tube to provide an increased volume for the expansion of exhaust gases emanating from the exhaust pipes of an engine, and in which is mounted a cable-controlled butterfly valve for selectively opening or restricting the passageway to absorb or baffle the sound produced by the explosions within the associated engine, and which is further provided with a second sound baffle or mute detachably carried in the outer end of the tube to further reduce or deaden the noise produced by engine explosions.

For a further and more detailed understanding of the present invention and the additional objects and advantages thereof, reference is made to the following description and the accompanying drawing wherein:

Fig. 1 is a side elevational view of the present improved muffler operably installed upon an associated motorcycle, shown in broken lines;

Fig. 2 is an enlarged side elevational view of the muffler;

Fig. 3 is an enlarged fragmentary vertical sectional view taken through the discharge end of the muffler disclosed in Fig. 2;

Fig. 4 is a transverse vertical sectional view taken along a plane indicated by the line 4—4 of Fig. 3;

Fig. 5 is an end elevational view of the muffler, disclosing particularly the removable mute positioned in the discharge end thereof;

Fig. 6 is a fragmentary vertical sectional view taken through the discharge end of the muffler, and a modified form of mute or sound baffle;

Fig. 7 is an end elevational view of the modified type of mute disclosed in Fig. 6.

Referring now to the drawing, the numeral 1 designates a motorcycle having an engine 2 which is provided with relatively short exhaust pipes or stacks 3 leading separately from each of the cylinders of the engine, or from the exhaust manifold thereof. Connected with the outer ends of each of the exhaust pipes 3, by means of suitable pipe connections 4, is an elongated and tapered tube 5, formed at its inner end with the previously mentioned pipe connections 4, and at its opposite outer end with a relatively enlarged discharge opening 6. The tube 5 is further provided with a straight internal chamber or passageway 7 leading from the pipe connections 4 to the discharge opening 6 of the tube, and being progressively enlarged in cross-section from the inner to the outer end of the tube. The tube 5 is provided upon its upper surface with a laterally extending attaching bracket 8 by which the tube may be supported and connected with a frame member of the associated motorcycle 1.

In cross section, the tube 5 and its passageway 7 possess a generally circular configuration, and positioned within the passageway of the tube adjacent the discharge end thereof is a circular butterfly valve 9 whose diameter is substantially less than the diameter of the internal passageway 7. The valve 9 is carried upon a centrally disposed shaft 10 extending transversely of the tube and rotatably supported within a pair of trunnion supports 11 formed in the outer wall of the tube. The plane of the trunnion supports 11 is disposed slightly below the major horizontal axis of the tube, so that the butterfly valve 9 is disposed eccentrically of the circular passageway 7, with the lower surface of the butterfly engaging the lower inner wall of the tube, as the former approaches a substantially vertical position. The centrally disposed shaft 10 extends outwardly from one of the trunnion supports 11, and is connected with a rocking lever 12 whose outer end is formed with an opening through which the outer end of a remotely controlled flexible cable 13 may be passed and secured to impart rocking movement to the lever 12, and tilting movement to the butterfly valve 9 with respect to the circular passageway 7. As shown particularly in Figs. 3 and 4 of the drawings, the butterfly 9 is movable, upon actuation of the rocking lever 12, between positions completely opening and partially closing the passageway 7. As the butterfly 9 approaches a substantially vertical position, as shown in Fig. 3, its lower edge strikes or drags the lower surface of the tube 5 to prevent further rocking movement of the butterfly past the position shown in Fig. 3. In this position, the butterfly presents a sound baffle, and exhaust gases passing outwardly of the tube 5 are deflected by the butterfly and are forced to pass between the space defined by the upper edge of the butterfly and the upper inner wall of the tube. Conversely, as the rocking lever 12 is actuated to position the butterfly in a horizontal plane, or along the longitudinal axis of the tube, exhaust gases are free to pass without obstruction from the pipe connection to the discharge end of the tube. Due to the fact that the passageway of the tube is increasingly enlarged toward the discharge end thereof, the restriction caused by the butterfly valve 9, as the same approaches a vertical position, will not materially affect the efficiency of the associated engine, because the area of the passageway between the upper edge or section of the butterfly and the inner surface of the tube wall closely approximates the area of the two exhaust stacks 3 of the engine, and therefore has approximately the same effect as if the exhaust pipes were extended through an untapered tube. Further, by increasing the volume through which the exhaust gases may pass from the exhaust pipes, the sound of the explosions within the engine are materially deadened, with the pitch of the explosions being reduced to a considerably lower note.

Detachably carried in the outer discharge opening 6 of the tube, is a substantially circular and perforate sound baffle or mute 14. The side walls of the mute are inwardly tapered to correspond to the taper of the outer end of the tube 5, in order that a close frictional fit may be obtained between the mute and the discharge opening of the tube. Further, the mute 14 is held in position by means of a screw-threaded bolt 15 introduced through the wall of the tube and receivable in a cooperatively screw-threaded opening formed in the side walls of the mute. The mute is provided with an arcuate handle member 16 extending from the rearward perforate face, and affording a handle by which the mute may be easily removed and replaced within the discharge opening 6 of the tube. The perforate wall of the mute 14 serves as an additional sound baffle, but at the same time provides for the free passage of exhaust gases therethrough.

In operation, the removable mute 14 is used for normal city driving, where a minimum of objectionable noise is desired. With the mute 14 in its position within the discharge opening of the tube, there is little need for closing the butterfly 9, except when passing through zones or districts where extreme quiet is required, in such an instance, the butterfly valve 9 may be actuated to partially block the passageway 7 of the tube, and to further reduce the noise of the associated engine. When driving upon the highway, particularly at relatively high speeds, and where maximum efficiency of the engine is required or desired, the mute 14 is removed altogether from the discharge opening of the tube, and the butterfly valve 9 is actuated in accordance with the desires of the driver. For instance, when passing through a town or city, or other populated area, the butterfly valve 9 provides a convenient means for temporarily decreasing the noise of the engine, but when once again upon the highway the same may be opened to provide for maximum efficiency within the engine.

Figs. 6 and 7 of the drawing disclose a modified type of mute which is removably positioned within the discharge opening 6 of the tube. In this form, the mute comprises an outwardly tapered body provided with three triangularly disposed fins 17. This mute is also provided with a relatively restricted discharge opening 18 at the outermost end thereof, and a relatively elongated open slot 19 formed in the lower under surface of the mute. The opening 18 and slot 19 provide for the discharge of exhaust gases from within the main tube 5, and due to the tapered configuration of the mute body, air turbulence is set up around the rearwardly projecting mute, particularly at relatively high speeds, which turbulence aids in the withdrawal of exhaust gases from within the mute and tube, thereby tending to increase the efficiency of the associated engine through the quick removal of the spent exhaust gases therefrom, or even to the extent of creating reduced pressures at the rearward end of the tube 5.

In view of the foregoing, it will be seen that the present invention provides a useful and mechanically efficient muffler for internal combustion engines, the same functioning to selectively control the degree and pitch of the sound emanating from the explosions within the associated engine, yet at the same time functioning in a manner so as not to reduce the overall efficiency of the associated engine by creating an undesirable back pressure within the exhaust system. The invention is further characterized by its structural simplicity, and its consequent economy of manufacture and maintenance.

While present preferred forms of the present invention have been disclosed in detail, it will be manifest that various modifications as to details of construction are possible without departing from the spirit of the invention or the scope of the following claims.

I claim:

1. A muffler for internal combustion engines having an exhaust pipe, comprising an elongated tube formed at one end with an exhaust pipe connection and at its opposite end with an exhaust discharge opening, said tube being formed with a tapered internal passageway having a circular cross-sectional configuration through which exhaust gases may pass, the passageway of said tube being progressively enlarged in cross-section from the pipe connection end thereof to the discharge opening of the tube, and a circular butterfly valve positioned eccentrically within the passageway of said tube adjacent the discharge end thereof and movable therein between positions opening and partially closing the passageway.

2. In a muffler for internal combustion engines having an exhaust pipe, an elongated open-ended tube connected at one of its ends with the exhaust pipe of an engine, said tube being formed with a tapered bore progressively enlarged in cross-section from the exhaust pipe-receiving end to the opposite end thereof, and a cable-controlled butterfly valve positioned within the bore of said tube and movable therein between positions opening and partially closing the bore, said valve having an area substantially less than the cross-sectional area of the bore of said tube where said valve is positioned, whereby to provide for substantially unrestricted passage of gases through said tube when said valve occupies its position of partial bore closure.

3. In a muffler for internal combustion engines having an exhaust pipe, an elongated open-ended tube connected at one of its ends with the exhaust pipe of an engine, said tube being formed with a tapered bore progressively enlarged in cross-section from the exhaust pipe-receiving end to the opposite end thereof, and a cable-controlled butterfly valve positioned eccentrically of the bore of said tube and movable therein between positions opening and partially closing the bore.

4. In a muffler for internal combustion engines having an exhaust pipe, a single longitudinally tapered tube formed at one end with an exhaust pipe-receiving opening and at its opposite end with a discharge opening and an internal longitudinally and continuously tapered passageway connecting said openings and progressively enlarged in cross-section from the exhaust pipe-receiving opening to the discharge opening, and a butterfly valve mounted within the passageway of said tube adjacent the discharge end thereof for movement between a position substantially parallel to the axis of said tube and a position substantially perpendicular to the longitudinal axis of said tube, said valve having a substantially smaller area than the cross-sectional area of the passageway of said tube where said valve is positioned whereby to provide a space between said valve and said tube at least equal to the area of said pipe-receiving opening at any position of said valve within said passageway.

JOHN A. CHRISTMAN.

REFERENCES CITED

The following references are of record in the file of this patent:

UNITED STATES PATENTS

| Number | Name | Date |
|---|---|---|
| 1,023,225 | Shlosberg | Apr. 16, 1912 |
| 1,375,621 | Wright | Apr. 19, 1921 |
| 1,615,147 | Taylor | Jan. 18, 1927 |
| 1,829,737 | Compo | Nov. 13, 1931 |
| 2,404,589 | Monaghan | July 23, 1946 |